(12) United States Patent
Izumi (10) Patent No.: US 7,016,076 B2
(45) Date of Patent: Mar. 21, 2006

(54) IMAGE COMMUNICATION APPARATUS AND METHOD

(75) Inventor: Michihiro Izumi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 907 days.

(21) Appl. No.: 09/745,477

(22) Filed: Dec. 26, 2000

(65) Prior Publication Data

US 2002/0051148 A1    May 2, 2002

(30) Foreign Application Priority Data

Dec. 27, 1999   (JP)   ................................. 11-371418

(51) Int. Cl.
*G06F 15/00*   (2006.01)

(52) U.S. Cl. ................. 358/1.9; 358/1.15; 358/426.02; 358/402; 358/539; 345/604

(58) Field of Classification Search ........... 358/426.02, 358/402, 539, 1.15, 1.9, 527, 518; 379/100.06; 345/603; 375/219
See application file for complete search history.

(56) References Cited

U.S. PATENT DOCUMENTS

| | | | | |
|---|---|---|---|---|
| 5,315,702 A | * | 5/1994 | Kusakawa | 345/603 |
| 5,434,684 A | * | 7/1995 | Sugiyama | 358/527 |
| 5,650,861 A | * | 7/1997 | Nakajima et al. | 382/239 |
| 5,699,489 A | * | 12/1997 | Yokomizo | 358/1.9 |
| 5,726,777 A | * | 3/1998 | Yoshida et al. | 358/500 |
| 5,801,853 A | * | 9/1998 | Yamada et al. | 358/504 |
| 5,818,870 A | * | 10/1998 | Yaguchi | 375/219 |
| 6,323,872 B1 | * | 11/2001 | Wozniak | 345/603 |
| 6,335,966 B1 | * | 1/2002 | Toyoda | 379/100.06 |
| 6,426,809 B1 | * | 7/2002 | Hayashi et al. | 358/529 |
| 6,441,913 B1 | * | 8/2002 | Anabuki et al. | 358/1.12 |
| 6,512,593 B1 | * | 1/2003 | Yashiki | 358/1.15 |
| 6,545,768 B1 | * | 4/2003 | Matsubara et al. | 358/1.15 |
| 6,611,355 B1 | * | 8/2003 | Kizawa | 358/1.9 |
| 2002/0093698 A1 | * | 7/2002 | Kagawa | 358/518 |

FOREIGN PATENT DOCUMENTS

| | | |
|---|---|---|
| EP | 0 865 192 A2 | 9/1998 |
| EP | 0 946 052 A1 | 9/1999 |
| JP | 06-030288 | 2/1994 |
| JP | 9-325924 | 12/1997 |
| JP | 11-27543 | 1/1999 |
| JP | 11-122496 | 4/1999 |
| JP | 11-196284 | 7/1999 |
| WO | WO99/20037 | 4/1999 |

* cited by examiner

*Primary Examiner*—Kimberly Williams
*Assistant Examiner*—Beniyam Menberu
(74) *Attorney, Agent, or Firm*—Fitzpatrick, Cella, Harper & Scinto (57) ABSTRACT

Color facsimile communication uses image data obtained by JPEG-compressing data having a CIE Lab color space. To attach a JPEG image to e-mail, image data obtained by JPEG-compressing data having an Internet standard YCbCr color space is desirable. When an image transmission method is selected, color space conversion (conversion to a CIE Lab or YCbCr color space) corresponding to the selected transmission method (facsimile transmission or transmission by attaching to e-mail) is performed for an image to be transmitted. This image subjected to the color space conversion is encoded by JPEG, and the encoded image is transmitted by the selected transmission method.

16 Claims, 9 Drawing Sheets

IMAGE COMMUNICATION APPARATUS AND METHOD

FIELD OF THE INVENTION

The present invention relates to an image communication apparatus and method and, more particularly, to an image communication apparatus and method having a color facsimile function and an e-mail communication function.

BACKGROUND OF THE INVENTION

A color facsimile communication scheme is recommended by ITU-T, and color facsimile apparatuses have been put into practical use.

Color facsimile communication uses image data compressed by a JPEG (Joint Photographic Experts Group) scheme. As the color space of this image data, a uniform color space which is independent of image input/output apparatuses such as scanners and printers is used, so that the color information of an image to be transmitted is not degraded by the color reproducibility of such apparatuses. International standard color facsimile communication requires the use of a uniform color space Lab defined by CIE (Commission Internationale de l'Eclairage).

Color facsimile transmission procedures are disclosed in various materials. For example, Japanese Patent Laid-Open No. 11-122496 explains as follows.

An image is read, and the image data obtained by A/D conversion is subjected to shading correction. A color correction unit reads out color correction data corresponding to the reading characteristics of an image reading device from a memory, and performs color correction. A color converter converts the color space of the color-corrected image data from an RGB color space into a CIE Lab color space, and the converted image data is subjected to JPEG compression. After that, the JPEG-compressed data is transmitted.

In color facsimile communication as described above, a read image is converted into a CIE Lab color space.

With the spread of the Internet, it is becoming more and more necessary to transmit images by attaching them to e-mail. Japanese Patent Laid-Open No. 9-325924 has proposed a technique which transmits an image read by a facsimile apparatus by converting the image into a TIFF (Tagged-Image File Format) and attaching the converted image to e-mail. An outline of this technique will be described below.

A user sets the originals of images to be transmitted on the transmission table of a facsimile apparatus and enters a password for checking whether the user is a registered user. The user then selects the transmission destination of the images from a communication partner table, inputs the abbreviated number of the destination, and presses a start key, or presses a one-touch key with which the communication partner is registered.

The facsimile apparatus reads the images of the originals on the original table one by one, encodes the read images into G3 image data by an MMR (Modified Modified READ) scheme, and stores the image data of all pages into an image memory. The facsimile apparatus reads out the designated transmission destination from the communication partner table and transmits the image data along with e-mail.

To transmit the images by attaching them to e-mail, the G3 image data is converted into TIFF image data. That is, TIFF class F header information is added to the head of the G3 image data to form TIFF image data. Since this TIFF image data is binary data, the data is further converted into text data.

When the transmission data in an e-mail form is completed, the facsimile apparatus connects to a provider by dial-up. When the line to the provider is set, the facsimile apparatus logs in by a PAP (Password Authentication Protocol), and transmits the e-mail by an SMTP (Simple Mail Transfer Protocol). After the transmission is completed, the facsimile apparatus logs off and disconnects the line.

As described above, image data used in color facsimile communication is obtained by JPEG-compressing image data having a CIE Lab color space. However, image data used in the Internet is obtained by JPEG-compressing image data having a YCbCr color space. Accordingly, when image data used in color facsimile communication is directly attached to e-mail and transmitted, a computer which has received the image data cannot reconstruct a correct image.

Japanese Patent Laid-Open No. 11-27543 has disclosed a color space switching means for use in a color facsimile apparatus. Japanese Patent Laid-Open No. 11-27543 has also disclosed a method of switching two color conversion processes: a color conversion process which converts, with little error, image data required to have high image quality, and a high-speed color conversion process for image data required to have only poor image quality. However, these means and method do not switch different color spaces in accordance with the communication methods as described above.

SUMMARY OF THE INVENTION

The present invention has been made to solve the above problem, and has as its object to transmit an image in an appropriate form in accordance with a selected communication method or with the transmission destination of the image.

To achieve the above object, a preferred aspect of the present invention discloses an image communication apparatus comprising: a selector, arranged to select an image transmission method; a converter, arranged to perform color space conversion corresponding to the selected transmission method for an image to be transmitted; an encoder, arranged to encode the image subjected to the color space conversion; and a transmitter, arranged to transmit the encoded image by the selected transmission method.

To achieve the above object, another preferred aspect of the present invention discloses an image communication apparatus comprising: a selector, arranged to select an image transmission destination; a converter, arranged to perform color space conversion corresponding to the selected transmission destination for an image to be transmitted; an encoder, arranged to encode the image subjected to the color space conversion; and a transmitter, arranged to transmit the encoded image by a transmission method corresponding to the selected transmission destination.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Image communication apparatuses according to embodiments of the present invention will be described below with reference to the accompanying drawings.

[First Embodiment]

Figure 1:
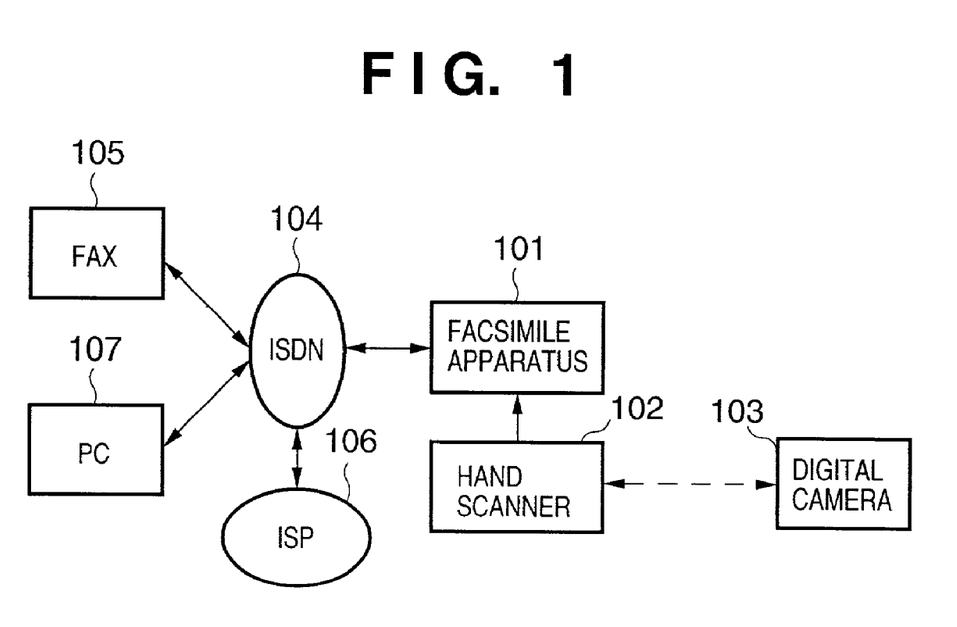
FIG. 1 is a block diagram showing an outline of the arrangement of a communication system according to the first embodiment.

FIG. 1 is a block diagram showing an outline of the arrangement of a communication system according to the first embodiment.

In FIG. 1, reference numeral 101 denotes a facsimile apparatus of the first embodiment; 102, a hand scanner connected to the facsimile apparatus 101; 103, a digital camera; 104, a communication network such as an ISDN (Integrated Services Digital Network); 105, a facsimile apparatus (FAX) as a communication partner; 106, an Internet service provider (ISP); and 107, a computer (PC) of the communication partner.

It is assume that image data is exchanged between the hand scanner 102 and the digital camera 103 via a storage medium such as a compact flash memory card (to be referred to as a "CF card" hereinafter) or a SMART memory card.

Figure 2A:
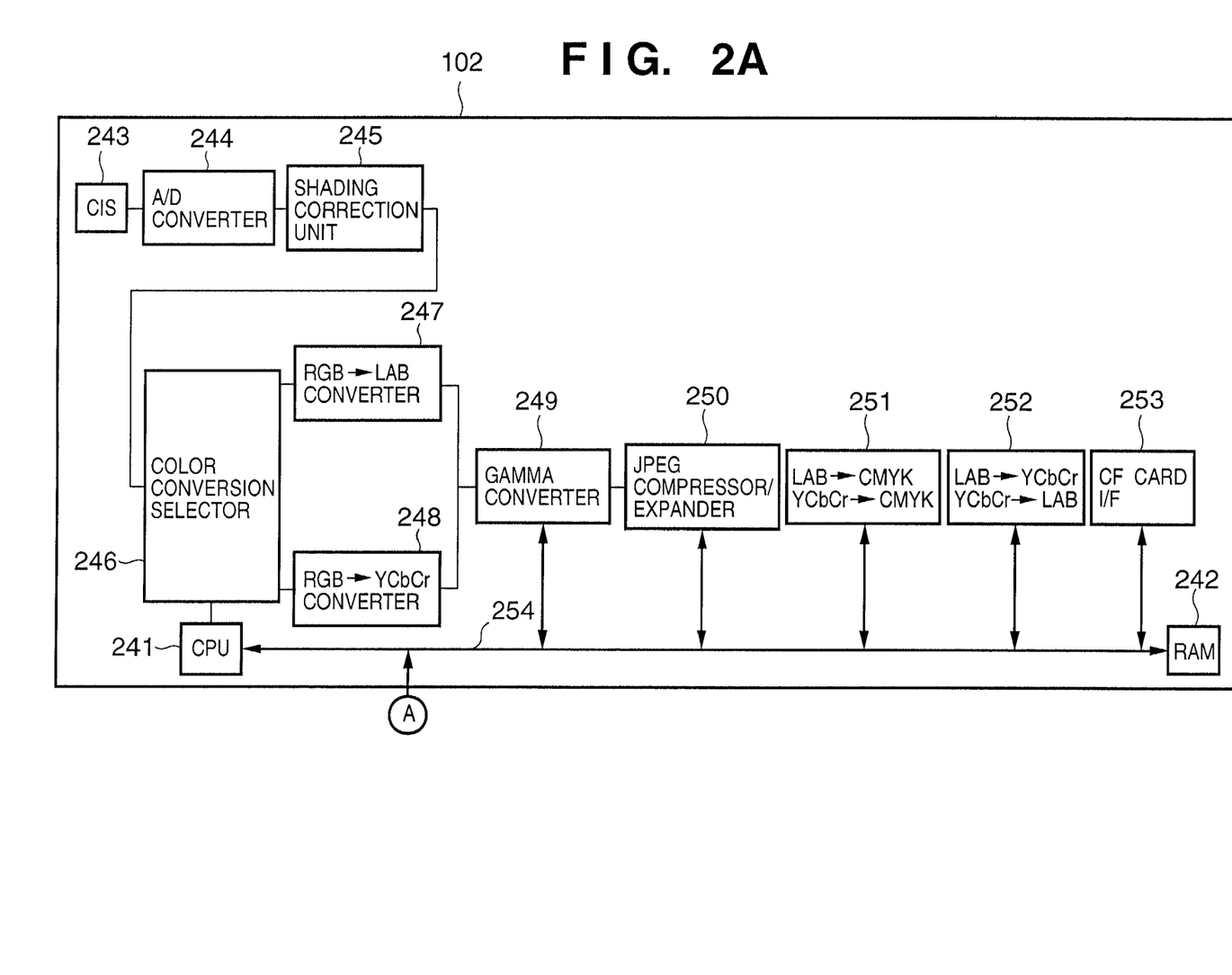
FIG. 2A is a block diagram showing the arrangement of a hand scanner.
Figure 2B:
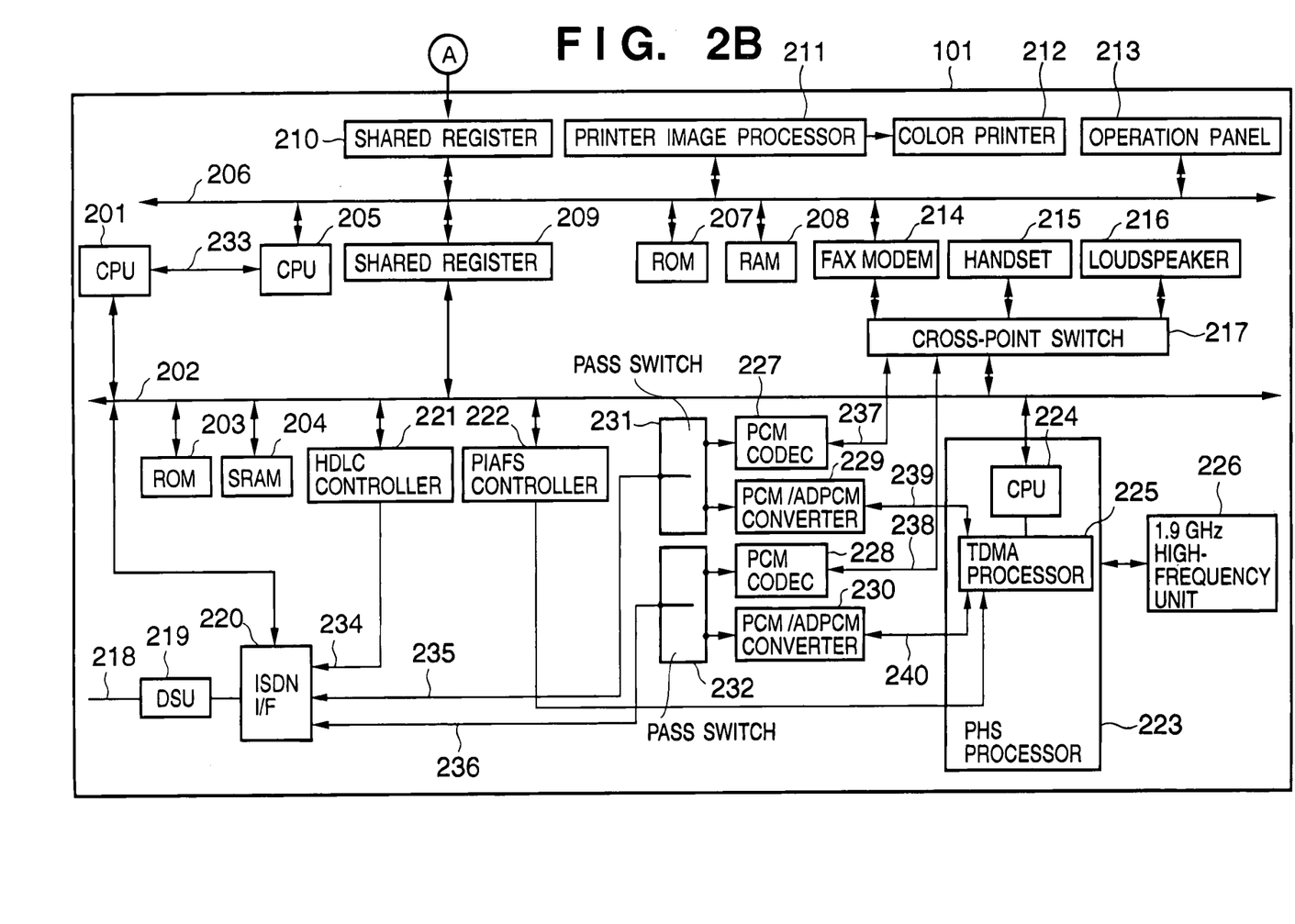
FIG. 2B is a block diagram showing the arrangement of a facsimile apparatus.

FIG. 2A is a block diagram showing the arrangement of the hand scanner 102. FIG. 2B is a block diagram showing the arrangement of the facsimile apparatus 101.

[Arrangement of Facsimile Apparatus]

In the facsimile apparatus 101 shown in FIG. 2B, a CPU 201 as a first controller loads programs stored in a ROM 203 via a system bus 202 which includes data and address buses. In accordance with the loaded programs, the CPU 201 executes various control operations including control to be described later by using an SRAM 204 as a work memory.

A CPU 205 as a second controller loads programs stored in a ROM 207 via a system bus 206 which includes data and address buses. In accordance with the loaded programs, the CPU 205 executes various processes, such as JPEG compression and expansion of digital image data by middleware, by using a RAM 208 as a work memory.

The system of the CPU 201 in which individual components are connected by the system bus 202 and the system of the CPU 205 in which individual components are connected by the system bus 206 exchange data via a shared register 209 connected between them. Analogously, the system of the CPU 205 and the hand scanner 102 exchange data via a shared register 210 connected between them.

An image processor 211 connected to the system bus 206 converts input image data into printing data matching the resolution (e.g., 360 dpi) of a color printer 212, and transmits the printing data to the color printer 212.

An operation panel 213 connected to the system bus 206 includes a display such as an LCD, ten-key pad, and various keys. This operation panel 213 allows a user to operate the facsimile apparatus 101 or displays the operating state of the facsimile apparatus 101.

A FAX MODEM 214 is controlled by the CPU 205 via the system bus 206 and connected to a cross-point switch 217. A handset 215 and loudspeaker 216 are also connected to this cross-point switch 217. Accordingly, input sounds and facsimile analog data from a communication line can be supplied to the handset 215, the loudspeaker 216, and the FAX MODEM 214, and output sounds and analog data from the handset 215 and the FAX MODEM 214 can be output to the communication line via the cross-point switch 217.

A DSU (Digital Service Unit) 219 connected to an ISDN line (U point) 218 converts data exchanged between office switching systems into a TTL-level signal. An ISDN interface 220 controls layers 1 to 3 of the ISDN and has a function of inputting and outputting B-channel data of the ISDN. An HDLC controller 221 assembles and disassembles data having an HDLC (High Level Data Link Control procedure) format of the ISDN. A PIAFS (PHS Internet Access Forum Standard) controller 222 is a radio data communication protocol processor which assembles and disassembles frames having a radio data communication protocol format.

In a PHS processor 223, a CPU 224 processes the protocol of PHS (Personal Handy-phone System, a kind of the digital cordless telephones) radio communication, and a TDMA (Time Division Multiple Access) processor 225 assembles and disassembles frames transmitted and received by 4-slot time-division multiplexing. A 1.9-GHz high-frequency unit 226 connected to the PHS processor 223 transmits and receives 1.9-GHz band radio waves. The use of the PHS processor 223 allows a digital cordless telephone to be accommodated in an extension.

PCM CODECs 227 and 228 perform conversion between analog signals and data encoded by PCM (Pulse Coded Modulation). PCM/ADPCM converters 229 and 230 convert data encoded by ADPCM (Adaptive Differential Pulse Coded Modulation), which is transmitted by PHS radio channels, into PCM-encoded data.

Pass switches 231 and 232 perform switching between an analog signal such as a facsimile signal and an audio signal transmitted from a digital cordless telephone via the PHS processor 223, as data to be transmitted by the ISDN line 218, under the control of the CPU 201.

Main signal lines will be described next. Reference numeral 233 denotes a serial communication line for exchanging control signals between the CPUs 201 and 205; 234 to 236, serial signal lines connected to the ISDN interface 220. The ISDN interface 220 selects two of these three signal lines and connect them to channels B1 and B2 of the ISDN line 218. Reference numerals 237 and 238 denote signal lines for analog signals input to and output from the FAX MODEM 214 and the handset 215; and 239 and 240, signal lines for ADPCM-encoded audio data input to and output from a digital cordless telephone.

[Arrangement of Hand Scanner]

In the hand scanner 102 shown in FIG. 2A, a CPU 241 as a one-chip microprocessor loads programs stored in a built-in ROM or the like. In accordance with the loaded programs, the CPU 241 executes diverse processes including processes to be described later via a system bus 254 including data and address buses by using a RAM 242 as a work memory.

A CIS (Contact Image Sensor) 243 for reading images incorporates LED arrays and line CCDs for red (R), green (G), and blue (B). When a read timing signal is input, the CIS 243 outputs a video signal of the read image in synchronism with the read timing signal.

An A/D converter 244 performs A/D (Analog to Digital) conversion for the output video signal from the CIS 243. A shading correction unit 245 performs well-known shading correction for the output RGB image data from the A/D converter 244.

A color conversion selector 246 is controlled by the CPU 241 on the basis of input user's instructions from the operation panel 213. When facsimile communication is to be performed, the color conversion selector 246 outputs input RGB image data to an RGB→LAB color space converter 247. Accordingly, the RGB image data is converted into CIE Lab image data. When a color image is to be transmitted by attaching it to e-mail, the color conversion selector 246 outputs the RGB image data to an RGB→YCbCr color space converter 248 where the RGB image data is converted into YCbCr image data.

A gamma converter 249 performs gamma correction for input image data. A JPEG compressor/expander 250 encodes (compresses) input image data to output JPEG data and decodes (expands) input JPEG data to output image data.

A processor 251 converts image data having CIE Lab and YCbCr color spaces into CMYK data for printing. A processor 252 coverts the color space of image data between a CIE lab color space and a YCbCr color space. A CF card interface 253 loads image data obtained by image sensing by, e.g., a digital camera and recorded on, e.g., a CF (Compact Flash) card.

Note that the conversion from an RGB to a CIE Lab color space, conversion from an RGB to a YCbCr color space, gamma conversion, JPEG compression/expansion, and conversion to CMYK data can also be performed by middleware of the CPU 241.

[Transmission of Read Image]

Figure 3A:
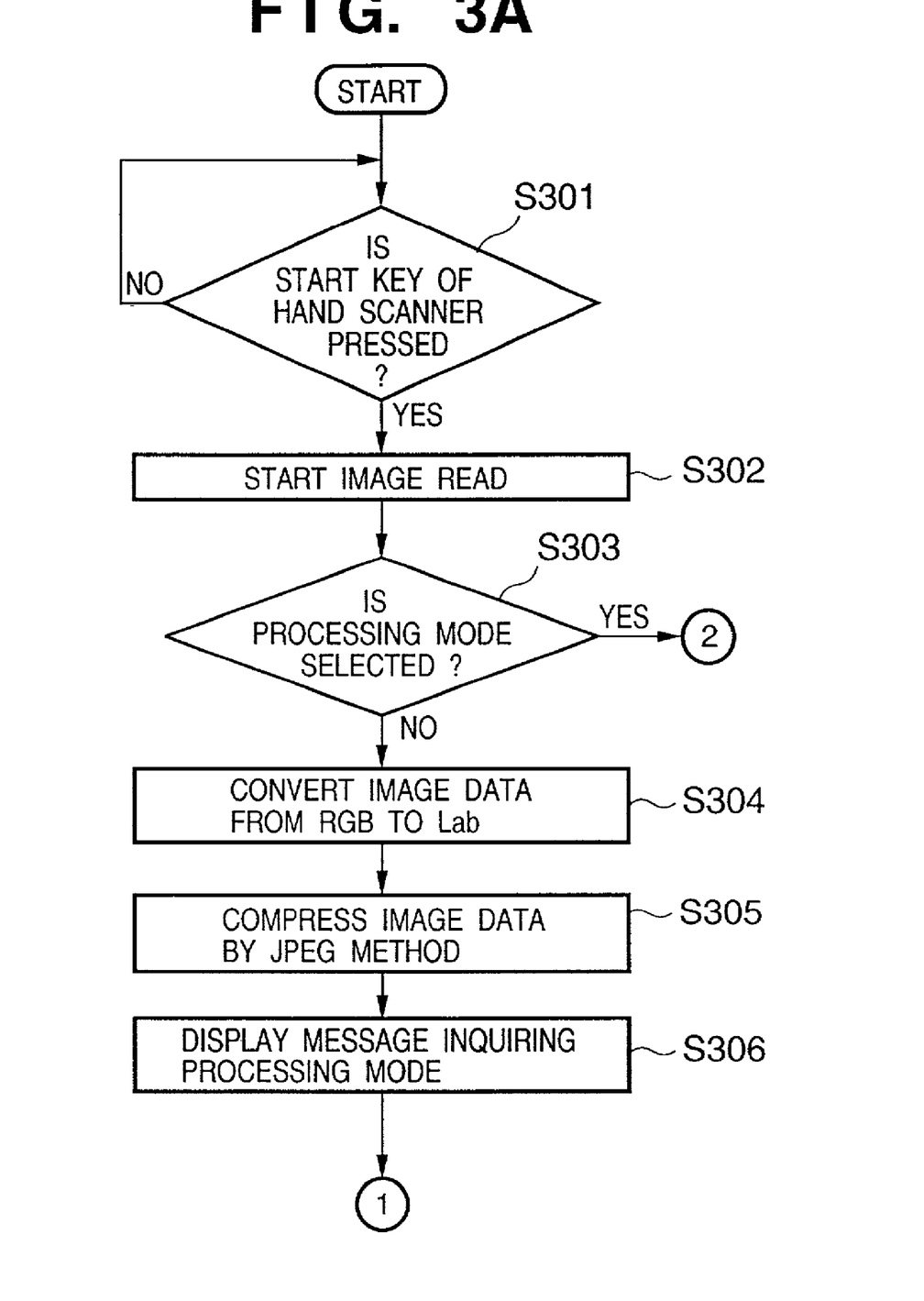
FIGS. 3A to 3C are flow charts for explaining an image printing or transmitting process.
Figure 3B:
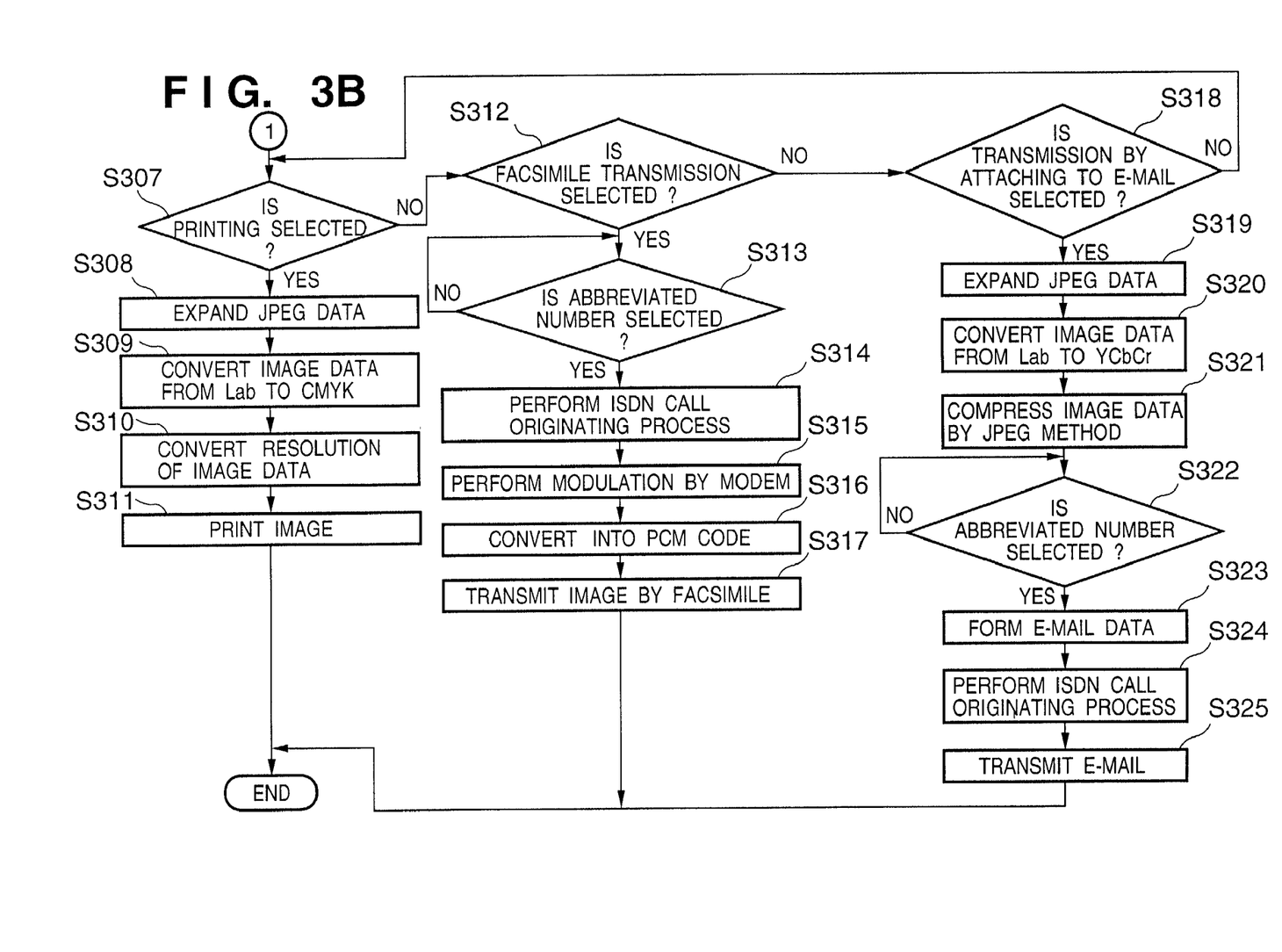

A process of printing or transmitting an image read by the hand scanner 102 connected to the facsimile apparatus 101 will be described below. FIGS. 3A and 3B are flow charts for explaining the image printing or transmitting process. This process is executed by, or under the control of, the CPUs 201, 205, and 241.

When a user removes the hand scanner 102 from the facsimile apparatus 101 and presses a start key of the hand scanner 102 (S301), image read is started (S302). When this image read by the hand scanner 102 is started, the CIS 243 outputs a video signal, and this output video signal is subjected to A/D conversion and shading correction.

If no image processing mode has been selected, i.e., whether an image is to be printed, transmitted by facsimile, or transmitted by attaching it to e-mail has not been determined before the start of image read (S303), the CPU 241 determines that facsimile transmission is to be performed as default processing, and controls the color conversion selector 246 to input the shading-corrected image data to the RGB→LAB converter 247 (S304). Processing when the processing mode is selected will be described later.

The image data converted into data having a CIE Lab color space is gamma-corrected by the gamma converter 249 and encoded by the JPEG compressor/expander 250, and this JPEG data is stored in the RAM 242 (S305).

When image read is completed and it is detected that the hand scanner 102 is attached to the facsimile apparatus 101, the CPU 201 displays on the operation panel 213 a message for inquiring of the user the processing mode of the read image, i.e., whether the image is to be printed, transmitted by facsimile, or transmitted by attaching it to e-mail (S306).

If "printing" is selected in response to the message (S307), the JPEG data stored in the RAM 242 of the hand scanner 102 is expanded by the JPEG compressor/expander 250 (S308) and converted from LAB to CMYK by the processor 251 (S309). The obtained printing data is temporarily stored in the RAM 242. This printing data stored in the RAM 242 is transferred to the printer image processor 211 via the shared register 210. The printer image processor 211 converts the resolution of the printing data to, e.g., 360 dpi (S310). The printing data having this converted resolution is transferred to the color printer 212, and the image is printed (S311).

If "facsimile transmission" is selected in response to the message (S312) and an abbreviated number is chosen (S313), an ISDN call originating process is performed for the selected telephone number (S314). If the ISDN line 218 responds, the JPEG data stored in the RAM 242 is transferred to the FAX MODEM 214 via the shared register 210. The FAX MODEM 214 modulates an analog signal on the basis of the JPEG data (S315). The modulated analog signal is converted into a PCM code by the PCM CODEC 237 (S316), and the code is transmitted to the ISDN line 218 (S317). If a facsimile apparatus (e.g., the FAX 105 in FIG. 1) of the communication partner is a color facsimile apparatus, i.e., has a JPEG expansion function, the image can be printed by expanding the JPEG data received by the ISDN line 218.

If "transmission by attaching to e-mail" is selected in response to the message (S318), the image data stored as data having a CIE Lab color space in the RAM 242 must be converted into data having a YCbCr color space. Therefore, the image data stored in the RAM 242 is expanded by the JPEG compressor/expander 250 (S319), converted into YCbCr-color-space data by the processor 252 (S320), and again encoded by the JPEG compressor/expander 250 (S321). This JPEG data is temporarily stored in the RAM 242.

When an abbreviated number corresponding to the e-mail address of the destination of e-mail is selected (S322), the JPEG data stored in the RAM 242 is transferred to the SRAM 204 via the shared registers 210 and 209 in order to form data to be attached to the e-mail.

Since it is defined that predetermined header information is to be added to e-mail of the Internet, predetermined header information including, e.g., "To:" (destination), "From:" (sender), "Subject:" (subject), "Cc:" (copy distribution), and "Date:" (date) is added before the JPEG data to be transmitted. In addition, information such as "Attachments: xxxx.jpg" indicating the JPEG data file to be attached is attached to the header information. The formed header information and the JPEG data stored in the SRAM 204 are combined to complete e-mail data (S323). This completed e-mail data is stored in the SRAM 204.

When the e-mail data is completed, an ISDN call originating process is performed for a previously registered provider (e.g., the ISP 106 in FIG. 1) (S324). If the ISDN line 218 responds, a communication path is connected to set a communication line to the provider. Subsequently, the apparatus logs in to the server of the provider by a PAP and transmits the e-mail data stored in the SRAM 204 by an SMTP (S325). More specifically, the e-mail data is transferred from the SRAM 204 to the HDLC controller 221 and assembled into an HDLC frame, and the e-mail data having this frame is transmitted to the provider via the ISDN interface 220.

When a computer (e.g., the PC 107 in FIG. 1) at the destination of the e-mail receives the e-mail data via the Internet, the user of the computer can obtain the JPEG data file attached to the e-mail. The user can see the received image by using software, e.g., a browser, running on the computer 107, which has a JPEG data expanding function.

[Transmission of Input Image]

Figure 3C:
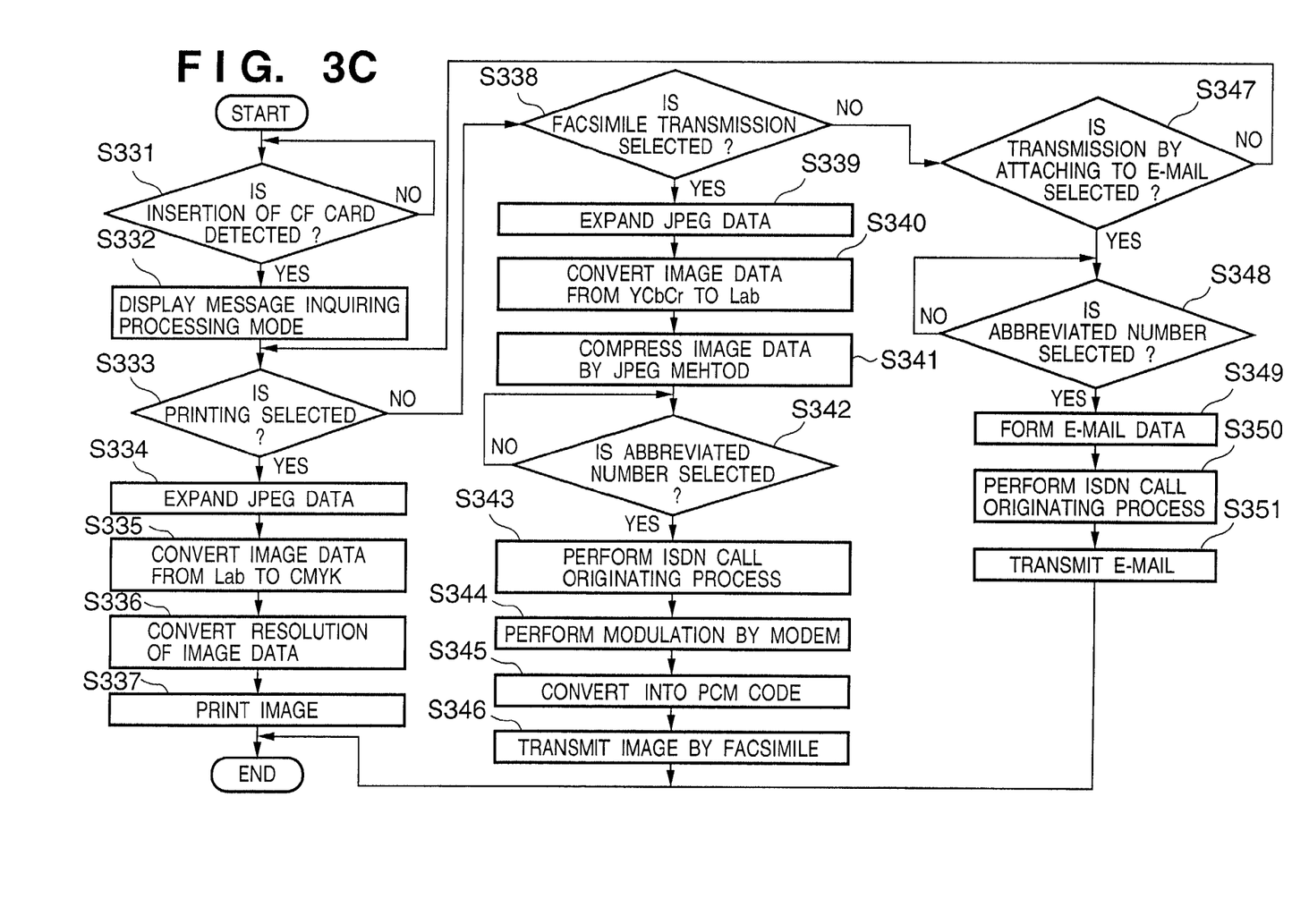

A process of inputting and transmitting image data obtained by image sensed by an image input device such as the digital camera 103 and recorded on a recording medium such as a CF card will be described below. FIG. 3C is a flow chart for explaining an image printing or transmitting process. This process is executed by, or under the control of, the CPUs 201, 205, and 241.

The digital camera 103 usually converts RGB image data obtained by photographing into YCbCr-color-space data, compresses the data by JPEG, and stores the compressed data in a CF card or the like. This JPEG data can be input via the CF card interface 253 of the hand scanner 102. That is, when the CPU 241 detects that a CF card or the like is inserted into the CF card interface 253 (S331), the CPU 205 displays on the operation panel 213 a message for inquiring the user of the processing mode of the input image (S332).

If "printing" is selected in response to the message (S333), the JPEG data read out from the CF card is expanded by the JPEG compressor/expander 250 (S334) and converted from YCbCr to CMYK by the processor 251 (S335). The obtained printing data is temporarily stored in the RAM 242. This printing data stored in the RAM 242 is transferred to the printer image processor 211 via the shared register 210. The printer image processing 211 converts the resolution of the printing data to, e.g., 360 dpi (S336). The printing data having this converted resolution is transferred to the color printer 212, and the image is printed (S337).

If "facsimile FAX transmission" is selected in response to the message (S338), the JPEG data read out from the CF card is expanded by the JPEG compressor/expander 250 (S339), converted from YCbCr to LAB by the processor 252 (S340), and compressed by JPEG by the JPEG compressor/expander 250 (S341). This JPEG data is stored in the RAM 242.

When an abbreviated number is chosen (S342), an ISDN call originating process is performed for the selected telephone number (S343). If the ISDN line 218 responds, the JPEG data stored in the RAM 242 is transferred to the FAX MODEM 214 via the shared register 210. The FAX MODEM 214 modulates an analog signal on the basis of the JPEG data (S344). The modulated analog signal is converted into a PCM code by the PCM CODEC 237 (S345), and the code is transmitted to the ISDN line 218 (S346).

If "transmission by attaching to e-mail" is selected in response to the message (S347), the JPEG data read out from the CF card is temporarily stored in the RAM 242 without color space conversion. When an abbreviated number corresponding to the e-mail address of the destination of e-mail is selected (S348), the JPEG data stored in the RAM 242 is transferred to the SRAM 204 via the shared registers 210 and 209 in order to form data to be attached to the e-mail. E-mail data is formed (S349) following the same procedure as in step S323 described above, and the completed e-mail data is stored in the SRAM 204.

When the e-mail data is thus completed, an ISDN call originating process is performed for a previously registered provider (e.g., the ISP 106 in FIG. 1) (S350). If the ISDN line 218 responds, a communication path is connected to set a communication line to the provider. Subsequently, the apparatus logs in to the server of the provider by a PAP and transmits the e-mail data stored in the SRAM 204 by an SMTP (S351).

In the first embodiment as described above, when a read or input image is to be transmitted by color facsimile transmission, the image is converted into image data having a CIE Lab color space and compressed by JPEG, and this JPEG data is transmitted. When a read or input image is to be transmitted by attaching it to e-mail, the image is converted into image data having a YCbCr color space and compressed by JPEG, and this JPEG data is transmitted.

Note that when an image is to be input from memory media, the image data format and the forms of the memory media are not limited to the above-mentioned format and form. That is, it is possible to prepare readers corresponding to different forms of memory media, prepare processes corresponding to different image data formats, and load image data of various formats stored in diverse memory media. When the loaded image data is to be transmitted by color facsimile transmission, the data is converted into image data having a CIE Lab color space and compressed by JPEG. When the loaded image data is to be transmitted by attaching it to e-mail, the data is converted into image data having a YCbCr color space and compressed by JPEG. Consequently, the images can be transmitted in the same manner as above.

[Second Embodiment]

An image communication apparatus according to the second embodiment of the present invention will be described below. The same reference numerals as in the first embodiment denote the same parts, and a detailed description thereof will be omitted.

In the first embodiment, no processing mode of a read image is selected before an image read process. However, if a processing mode is selected before image read, image data can be converted into an optimum color space immediately after the image is read. For example, when an image is to be transmitted by attaching it to e-mail in the first embodiment, image data converted into a CIE Lab color space and compressed by JPEG must be expanded by JPEG, converted from LAB to YCbCr, and again compressed by JPEG. This naturally complicates the process and prolongs the processing time. In addition, the image quality unavoidably suffers because lossy JPEG compression and expansion are repeated.

Figure 4:
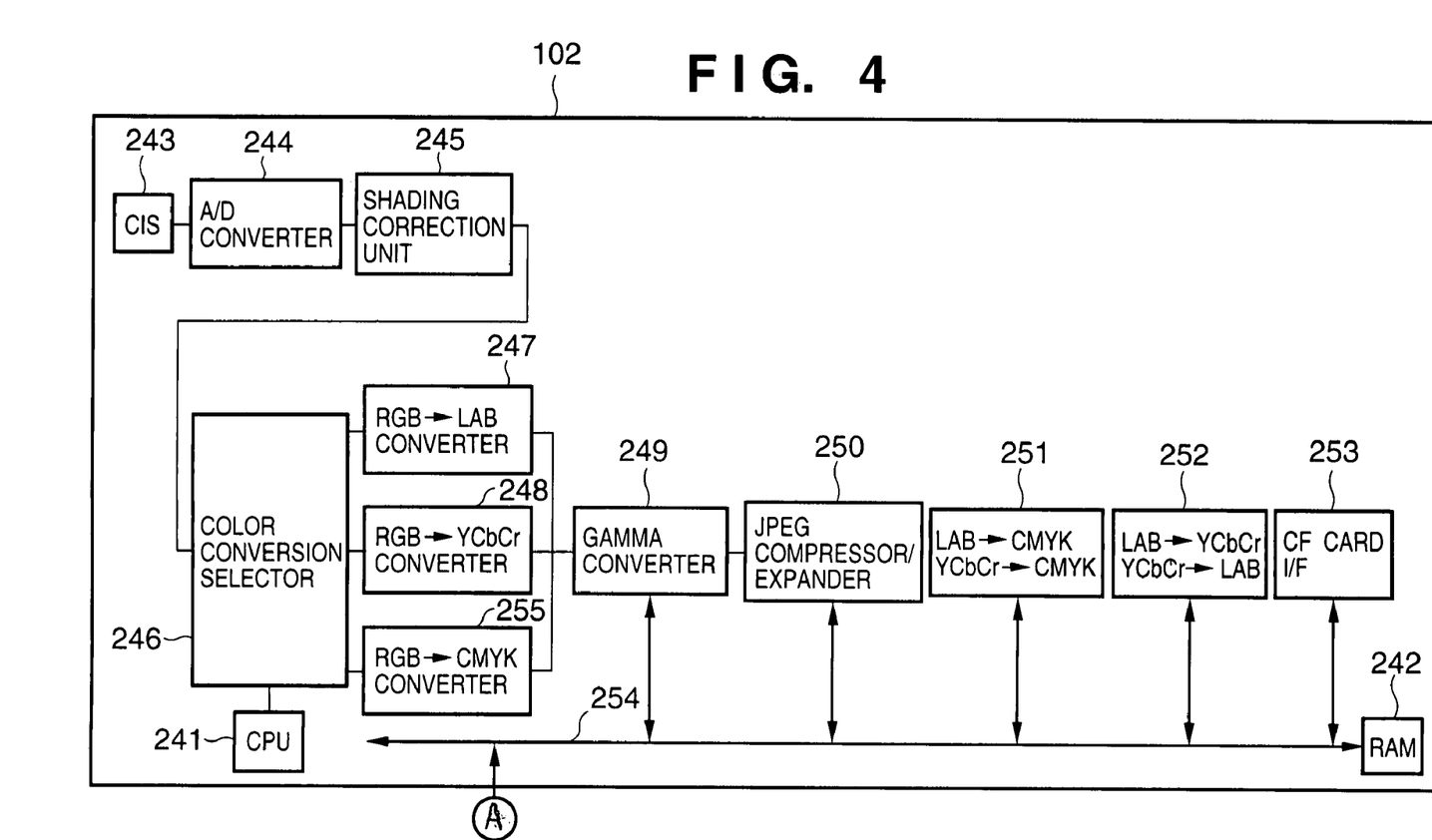
FIG. 4 is a block diagram showing the arrangement of a hand scanner of the second embodiment.

In the second embodiment, processing when a processing mode is selected before image read will be explained. FIG. 4 is a block diagram showing the arrangement of a hand scanner 102 of the second embodiment. This arrangement is the same as that shown in FIG. 2A except that an RGB→CMYK converter 255 is added.

Figure 5:
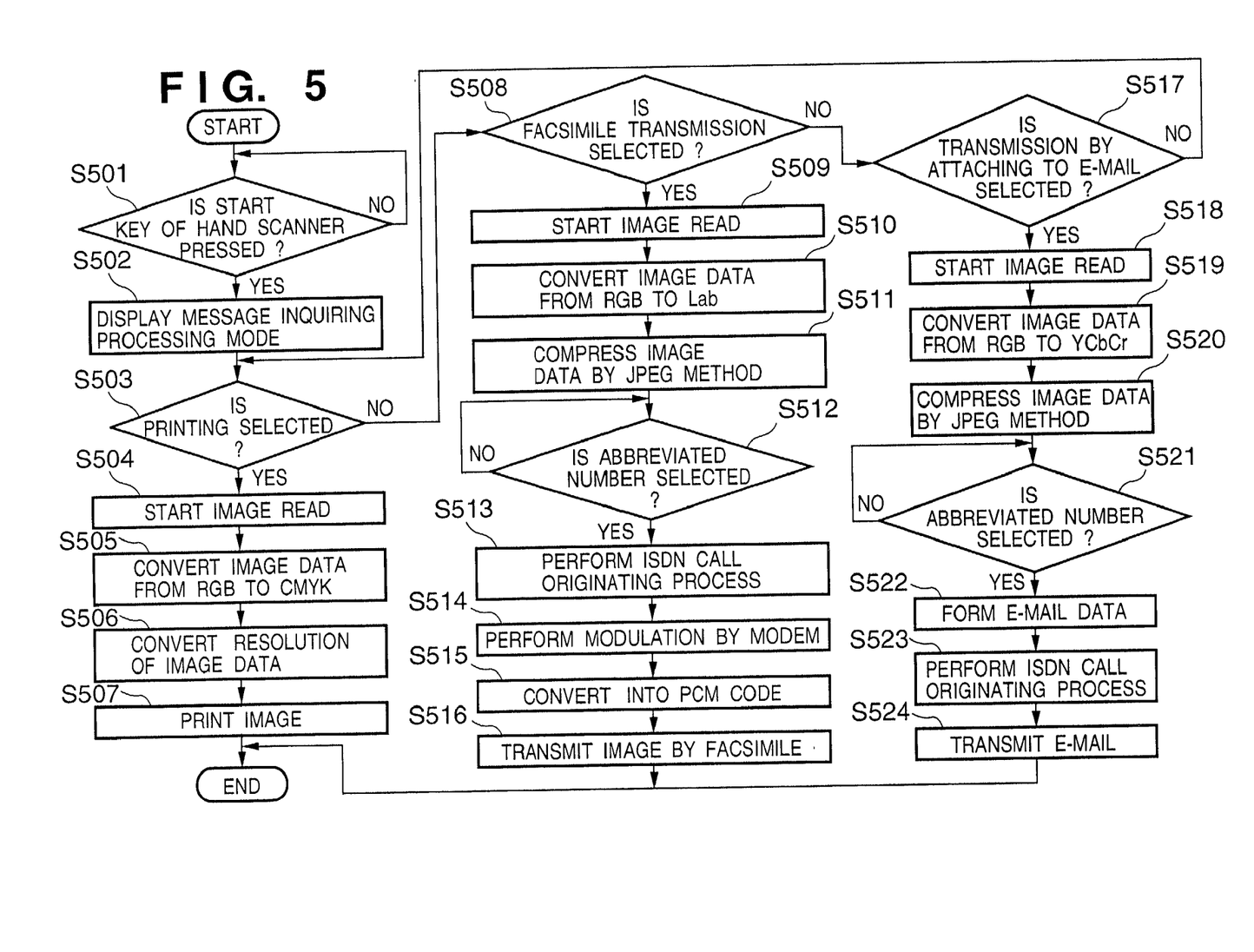
FIG. 5 is a flow chart for explaining an image printing or transmitting process.

FIG. 5 is a flow chart for explaining an image printing or transmitting process of the second embodiment. This process is executed by, or under the control of, CPUs 201, 205, and 241.

When a user removes the hand scanner 102 from a facsimile apparatus 101 and presses a start key of the hand scanner 102 (S501), the CPU 205 displays on an operation panel 213 a message for inquiring of the user a processing mode of an input image (S502).

If "printing" is selected in response to the message (S503), image read is started (S504). The image data is converted into printing data through A/D conversion, shading correction, and conversion by the RGB→CMYK converter 255 (S505). This printing data is stored in a RAM 242 after gamma conversion. The printing data stored in the RAM 242 is transferred to a printer image processor 211 via a shared register 210. The printer image processor 211 converts the resolution of the printing data to, e.g., 360 dpi (S506). The printing data having this converted resolution is transferred to a color printer 212, and the image is printed (S507).

If "facsimile transmission" is selected in response to the message (S508), image read is started (S509). The image data is converted into data having a CIE Lab color space through A/D conversion, shading correction, and conversion by an RGB→LAB converter 247 (S510). This image data is gamma-converted, JPEG-compressed (S511), and stored in the RAM 242.

When an abbreviated number is chosen (S512), an ISDN call originating process is performed for the selected telephone number (S513). If an ISDN line 218 responds, the JPEG data stored in the RAM 242 is transferred to a FAX MODEM 214 via the shared register 210. The FAX MODEM 214 modulates an analog signal on the basis of the JPEG data (S514). The modulated analog signal is converted into a PCM code by a PCM CODEC 237 (S515), and the code is transmitted to the ISDN line 218 (S516).

If "transmission by attaching to e-mail" is selected in response to the message (S517), image read is started (S518). The image data is converted into data having a YCbCr color space through A/D conversion, shading correction, and conversion by an RGB→YCbCr converter 248 (S519). This image data is gamma-converted, JPEG-compressed (S520), and stored in the RAM 242.

When an abbreviated number corresponding to the e-mail address of the destination of e-mail is selected (S521), the JPEG data stored in the RAM 242 is transferred to the SRAM 204 via the shared register 210 and a shared register 209 in order to form data to be attached to the e-mail. E-mail data is completed in the same manner as in step S323 described earlier (S522), and the completed e-mail is stored in the SRAM 204.

When the e-mail data is thus completed, an ISDN call originating process is performed for a previously registered provider (e.g., an ISP 106 in FIG. 1) (S523). If the ISDN line 218 responds, a communication path is connected to set a communication line to the provider. Subsequently, the apparatus logs in to the server of the provider by a PAP and transmits the e-mail data stored in an SRAM 204 by an SMTP (S524).

In the second embodiment as described above, the same effects as in the first embodiment are obtained. In addition, by selecting a processing mode of a read image before image read is started, the read image data can be efficiently converted into an optimum color space. This can facilitate the processing and shorten the processing time. Also, deterioration of the image quality can be avoided since lossy JPEG compression and expansion are not repeated.

[Modification of the Embodiments]

Figure 6:
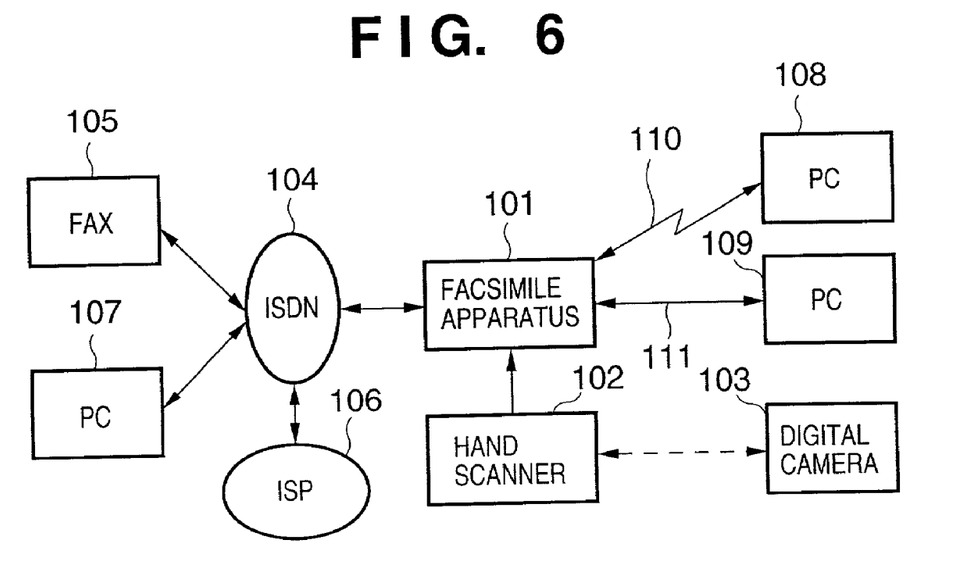
FIG. 6 is a block diagram showing the arrangement of another communication system.

In each of the above embodiments, images are transmitted by facsimile communication or e-mail via a public line. However, images can also be transmitted to computers in the same building or to nearby computers by using radio communication media such as Bluetooth, IrDA, and PHS or wired communication media such as USB (Universal Serial Bus) and IEEE1394. FIG. 6 is a block diagram showing a system configuration like that.

In FIG. 6, reference numerals 108 and 109 denote computers (PCs) in the same building as a facsimile apparatus 101; 110, a radio communication channel using Bluetooth, IrDA, or PHS; and 111, a wired communication line using USB or IEEE1394. Image data used in communication of the system shown in FIG. 6 is obtained by compressing YCbCr-color-space image data by JPEG as in image communication using e-mail.

The difference from image transmission using e-mail explained in each of the above embodiments is that when transmission is designated, a communication link is established in accordance with the communication protocol of a communication medium used in communication, instead of call originating for an ISDN line. JPEG data is then transmitted on the established communication line to allow the image to be seen on the computer 108 or 109 having a JPEG expanding function.

In each of the above embodiments, a processing mode is selected in accordance with a message "Printing? FAX transmission? E-mail transmission?". That is, an image transmission mode is selected as well as a processing mode. Therefore, dedicated keys such as a "FAX key" and an "E-mail key" can be formed on the operation panel 213.

When an image is to be transmitted, on the other hand, a transmission mode can be automatically discriminated by checking whether a selected abbreviated number corresponds to the telephone number of a facsimile apparatus or to an e-mail address. When this discrimination is performed, a message can be "Printing? Transmission?" Furthermore, if the telephone number of a facsimile apparatus is registered in an abbreviated number (telephone directory), "F" is displayed beside the name; if the registered information is an e-mail address, "E" is displayed beside the name. This allows the user of the facsimile apparatus to readily identify the destination.

In each of the above embodiments, an ISDN is used as a public line, and transmission is performed such that an analog signal modulated by the MODEM is encoded by PCM in facsimile transmission, and that data assembled into an HDLC frame is directly transmitted to the ISDN in e-mail transmission. However, the public line can also be an analog line (PSTN). In this case, when facsimile transmission is to be performed by using this analog line, an analog signal modulated by the MODEM is directly transmitted. When e-mail is to be transmitted, analog signal modulated on the basis of the e-mail data by the MODEM is transmitted.

In each of the above embodiments, color space converters are housed in the hand scanner 102. However, these color space converters may also be accommodated in the facsimile apparatus 101. The same effect can be obtained regardless of whether color space conversion and JPEG compression/expansion are performed by hardware or software.

In each of the above embodiments, the hand scanner 102 is removed from the facsimile apparatus 101 to read images. However, the same effect can be obtained regardless of whether the hand scanner 102 is attached to the facsimile apparatus 101 or whether the hand scanner 102 is detachable from the facsimile apparatus 101.

As many apparently widely different embodiments of the present invention can be made without departing from the spirit and scope thereof, it is to be understood that the invention is not limited to the specific embodiments thereof except as defined in the appended claims.

What is claimed is:

1. An image communication apparatus comprising:
   a selector, arranged to select a method of transmitting an image by facsimile or a method of transmitting an image by attaching the image to e-mail;
   a converter, arranged to perform color space conversion corresponding to the selected transmission method for an image to be transmitted;
   an encoder, arranged to encode the image subjected to the color space conversion; and
   a transmitter, arranged to transmit the encoded image by the selected transmission method,
   wherein said converter converts a color space of an image to be transmitted into a CIELab color space when the method of transmitting an image by facsimile is selected, or into a YCrCb color space when the method of transmitting an image by attaching the image to e-mail is selected, before a start of communication with a communication partner.

2. The apparatus according to claim 1, wherein said encoder performs JPEG coding.

3. The apparatus according to claim 1, wherein said transmitter comprises:
   a modulator, arranged to modulate a signal on the basis of the encoded image when the method of transmitting an image by facsimile is selected; and
   a generator, arranged to generate e-mail data containing the encoded image when the method of transmitting an image by attaching the image to e-mail is selected.

4. The apparatus according to claim 3, wherein said transmitter further comprises:
   a PCM encoder, arranged to encode the modulated signal by PCM when the method of transmitting an image by facsimile is selected; and
   a sender, arranged to send a PCM code to a digital communication line and send e-mail data to the Internet.

5. The apparatus according to claim 1, further comprising a reader, arranged to read an image to be transmitted from an original and output an RGB-color-space image.

6. The apparatus according to claim 1, further comprising an inputter, arranged to input an image recorded in a memory medium as an image to be transmitted.

7. An image communication method comprising the steps of:
   manually selecting a method of transmitting an image by facsimile or a method of transmitting an image by attaching the image to e-mail;
   performing color space conversion corresponding to the selected transmission method for an image to be transmitted before a start of communication with a communication partner;
   encoding the image subjected to the color space conversion; and
   transmitting the encoded image by the selected transmission method,
   wherein said performing step includes converting a color space of an image to be transmitted into a CIELab color space when the method of transmitting an image by facsimile is selected, or into a YCrCb color space when the method of transmitting an image by attaching the image to e-mail is selected.

8. A computer program product stored on a computer readable medium comprising a computer program code, for an image communication method, the method comprising the steps of:
   manually selecting a method of transmitting an image by facsimile or a method of transmitting an image by attaching the image to e-mail;
   performing color space conversion corresponding to the selected transmission method for an image to be transmitted before a start of communication with a communication partner;
   encoding the image subjected to the color space conversion; and
   transmitting the encoded image by the selected transmission method,
   wherein said performing step includes converting a color space of an image to be transmitted into a CIELab color space when the method of transmitting an image by facsimile is selected, or into a YCrCb color space when the method of transmitting an image by attaching the image to e-mail is selected.

9. An image communication apparatus comprising:
   a selector, arranged to select an image transmission destination;
   a converter, arranged to perform color space conversion corresponding to the selected transmission destination for an image to be transmitted;
   an encoder, arranged to encode the image subjected to the color space conversion; and
   a transmitter, arranged to transmit the encoded image by a transmission method corresponding to the selected transmission destination,
   wherein said converter converts the color space of an image to be transmitted into a CIELab color space when the transmission method is facsimile, or into a YCrCb color space when the transmission method is e-mail attached the image, before a start of communication with a communication partner.

10. The apparatus according to claim 9, wherein said encoder performs JPEG coding.

11. The apparatus according to claim 9, wherein said transmitter comprises:
    a modulator, arranged to modulate a signal on the basis of the encoded image when the transmission destination corresponds to the method of transmitting an image by facsimile; and
    a generator, arranged to generate e-mail data containing the encoded image when the transmission destination corresponds to the method of transmitting an image by attaching the image to e-mail.

12. The apparatus according to claim 11, wherein said transmitter further comprises:
    a PCM encoder, arranged to encode the modulated signal by PCM when the transmission destination corresponds to the method of transmitting an image by facsimile; and
    a sender, arranged to send a PCM code to a digital communication line and send e-mail data to the Internet.

13. The apparatus according to claim 9, further comprising a reader, arranged to read an image to be transmitted from an original and output an RGB-color-space image.

14. The apparatus according to claim 9, further comprising an inputter, arranged to input an image recorded in a memory medium as an image to be transmitted.

15. An image communication method comprising the steps of:

manually selecting an image transmission destination;

performing color space conversion corresponding to the selected transmission destination for an image to be transmitted before a start of communication with the selected destination;

encoding the image subjected to the color space conversion; and transmitting the encoded image by a transmission method corresponding to the selected transmission destination, wherein said performing step includes converting a color space of an image to be transmitted into a CIELab color space when the transmission method is facsimile, or into a YCrCb color space when the transmission method is e-mail attached to image.

16. A computer program product stored on a computer readable medium comprising a computer program code, for an image communication method, the method comprising the steps of:

manually selecting an image transmission destination;

performing color space conversion corresponding to the selected transmission destination for an image to be transmitted before a start of communication with the selected destination;

encoding the image subjected to the color space conversion; and transmitting the encoded image by a transmission method corresponding to the selected transmission destination, wherein said performing step includes converting a color space of an image to be transmitted into a CIELab color space when the transmission method is facsimile, or into a YCrCb color space when the transmission method is e-mail attached the image.

* * * * *